June 2, 1964

J. B. OTTESTAD ETAL 3,135,140

HIGH-ENERGY IMPACT MACHINE

Filed April 19, 1962

INVENTORS,
JACK B. OTTESTAD
SAMUEL A. SKEEN
BY
Angus & Mon
ATTORNEYS.

June 2, 1964  J. B. OTTESTAD ETAL  3,135,140
HIGH-ENERGY IMPACT MACHINE
Filed April 19, 1962  7 Sheets-Sheet 2

INVENTORS,
JACK B. OTTESTAD
SAMUEL A. SKEEN
BY
Angus & Mon
ATTORNEYS.

FIG. 5

June 2, 1964     J. B. OTTESTAD ETAL     3,135,140
HIGH-ENERGY IMPACT MACHINE Filed April 19, 1962     7 Sheets-Sheet 6

FIG. 12

INVENTORS
JACK B. OTTESTAD
SAMUEL A. SKEEN
BY
ATTORNEYS

June 2, 1964     J. B. OTTESTAD ETAL     3,135,140
HIGH-ENERGY IMPACT MACHINE
Filed April 19, 1962

INVENTORS
JACK B. OTTESTAD
SAMUEL A. SKEEN
ATTORNEYS

3,135,140
HIGH-ENERGY IMPACT MACHINE
Jack B. Ottestad, La Jolla, Calif., and Samuel A. Skeen, La Grange, Ill., assignors to U.S. Industries, Inc., a corporation of Delaware
Filed Apr. 19, 1962, Ser. No. 190,524
29 Claims. (Cl. 78—42)

This invention relates to a high-energy impact machine used in forming metal and this application is a continuation-in-part of our application Serial No. 26,291, filed May 2, 1960, entitled High Energy, High Velocity Impact Machine, now abandoned.

Metal blanks can be formed or shaped by the transformation of kinetic energy into an impact force which is sufficient to create permanent deformation of the metal. This impact force may be imparted to the metal in a number of different ways. One of the more conventional ways has utilized large propelled drop hammers which, because of their size, have a large amount of kinetic energy which in turn is transformed into the force necessary to form the blank by forging action. It has been found, however, that regardless of the amount of energy delivered to the blank to be formed, there are still instances where the blank cannot be formed in a single blow so that it is necessary to subject the blank to repeated blows of the hammer whereby it is taken through a series of transitional shapes before the final desired shape is achieved. If the blank has been heated in order to reduce the force necessary to deform it, objectionable scale may build up on the surface which is then driven or folded into the blank.

Some objectionable features of such large propelled hammers are the high initial cost of such machines, the large space required for housing the machines, and the necessity of having sufficient foundations to support the machine and to absorb the shock of the hammer hitting the metal blank.

It has been found that if metal is formed by high-energy rate techniques, that is the metal is subjected to a force applied at extremely high velocities, it will be caused to move through an elastic state to a plastic state where it will flow into the desired shape within a thousandths of a second. The high velocity forces may be obtained by pressure waves caused by use of explosives or high voltage sparks, magnetic forces or by use of a compressed gas which directly shapes the metal or drives a piston at high velocity into a workpiece to shape it.

The use of high-energy rate forming techniques results in reduction of the size of the forming equipment needed to form large metal blanks in parts being made of materials that cannot be easily formed by conventional forging methods, in improved dimensional tolerances to the parts produced, and in production of parts by a single application of force and such techniques eliminate problems associated with high forging temperatures, such as die heating, scale, shrinkage and distortion of the part formed.

Some of the high-energy rate techniques of forming, however, have objectionable features which, in some instances, outweigh any benefits derived from such forming.

Explosive forming entails the use of explosives which in turn require elaborate safety precautions. Often a water pit is used in order to transmit shock waves from the explosive to the metal blank and die. The use of water pits results in a comparatively slow production rate since the die and blank must be positioned in the pit prior to each forming action.

Spark forming, in which shock waves are generated by high voltage sparks, requires the use of costly electric capacitors in order to generate the required amount of power. In addition, water pits are often used to transmit the shock wave to the blank and die.

Magnetic forming, while doing away with the need of water pits, necessitates the use of costly electric equipment in order that the required amount of current may be passed through coils and the metal blank in order to create the required magnetic field to force the blank into a die. A further difficulty of using either magnetic or explosive forming processes is that it is hard to use heated dies with such processes. This is particularly true when water pits are used.

High-energy rate forming of metal blanks utilizing the energy of compressed gas overcomes the above difficulties inherent with other high-energy rate apparatus since no costly electric equipment is required, there is no danger of explosion, no use of water pits is required and, if desired, heated dies may be readily used.

Apparatus utilizing high-energy rate gas forming of metal has in the past mostly used a single plate which is moved at high velocities by compressed gas acting on a piston towards a stationary plate on which a metal blank and die half are mounted with the impact of the movable plate on the blank generating the force necessary to form the blank. These single piston machines require the use of a heavy tie bar or frame structure to hold the stationary plate to the machine and elaborate damping structure to absorb shocks of the machine that would otherwise be transmitted to the supporting floor.

Double piston machines have been proposed wherein two movable plates are connected to opposed pistons that move toward each other at high velocities under the force of compressed gas thus substantially increasing the energy available for forming. Such machines do not require elaborate tie bar or damping structure since the impact forces will be absorbed entirely by the metal blank. The difficulty with such machines, however, is to insure that the kinetic energy developed by each plate is substantially the same. This in turn requires that the force exerted by the compressed gas on the plates be the same and that both plates be subjected to such forces at exactly the same instant. This last-mentioned requirement necessitated, in past art, complicated pressure control equipment which even then did not always insure that the two pistons would be triggered at exactly the same instant.

In any of the high-energy rate machines where compressed gas acts on a piston to move a plate at high velocities, it is highly important that the die halves be accurately positioned to insure exact alignment at closure. It is therefore desirable that the die halves may be brought gradually together to check the alignment.

It is a further object of our invention to provide for a high-energy rate impact machine using compressed gas for driving two movable plates toward each other so constructed as to insure that the plates will be triggered for movement at the same instant of time and each under identical acceleratory forces.

It is a further object to provide for such a machine wherein both movable plates may be gradually moved or inched toward each other to insure accurate alignment of the die halves and to provide for energy regulating means whereby the energy available to accelerate the plates toward one another may be readily varied and measured.

Broadly our high-energy impact machine comprises two plates which are movable toward and away from each other wherein a cylinder, which is adapted to be in communication with a source of high pressure, extends into one of the plates. A driver piston sealingly and slidably engages the side walls of the cylinder and when in the end of the cylinder which extends into the plate, seals the cylinder off from pressure communication with the source of high pressure. The driver piston in turn is connected by post means which extend through the plate to which the cylinder is connected to the other of the plates. When the piston is moved with respect to the cylinder by an outside trigger force, the cylinder will be unsealed with respect to the source of high pressure and one side of the piston will then be subjected to the high pressure causing it to accelerate in one direction and the same high pressure will act on a portion of the cylinder to accelerate it in an opposite direction to move the plates together at high velocity such that the driver piston and cylinder together serve as an actuating means for accelerating the two plates towards one another.

In addition, the plate to which the cylinder is attached contains a high pressure chamber into which gas may be compressed to form the source of high pressure. The gas is injected into the high pressure chamber by way of the cylinder when the driver piston is in a position where it does not seal the high pressure chamber with respect to the cylinder. The driver piston has a bleed passage therethrough through which the gas from the cylinder may flow into the high pressure chamber. Gas in the cylinder and in the high pressure chamber is compressed by means of a floating piston contained in the end of the cylinder opposite the driver piston which is forced towards the driver piston by hydraulic pressure to compress the gas between the two pistons.

In addition, in one form of the invention, we provide for the plates to be positioned one above the other with the top plate supported against gravity by means of a compensating or counterbalancing means which also serves as an inching means by which the upper plate may be gradually lowered to contact the lower plate. Also lower inching means are provided in order to slowly raise the lower plate to contact the upper plate and by which the machine may be triggered. Energy regulator and indicator means may be provided to all forms of the invention by which the gas available for compression into the high pressure chamber may be varied and read on scale.

Referring to the drawings in which preferred embodiments of our invention are shown.

Figures 1, 2:
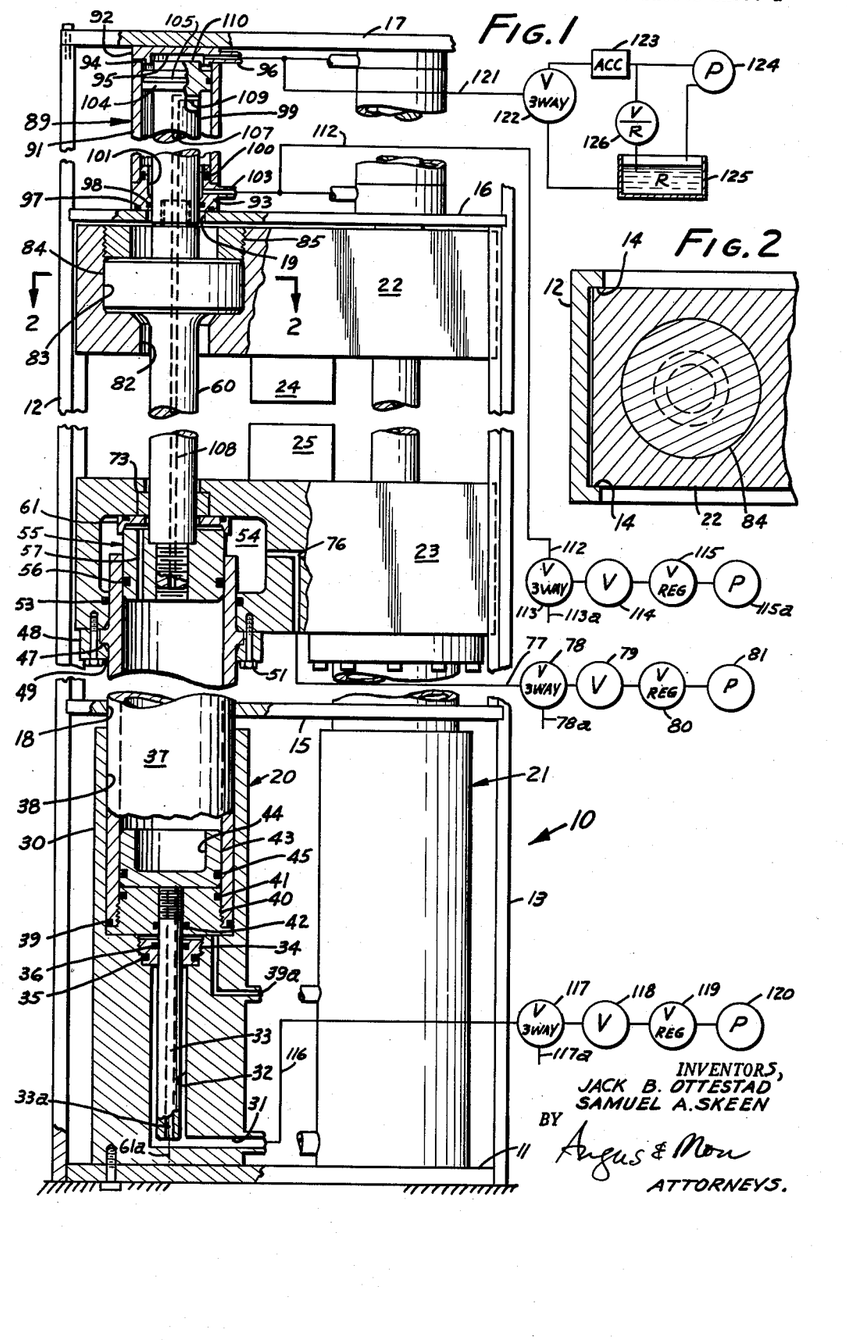
FIG. 1 is a side elevation, partly in cutaway cross section and partly in schematic notation, illustrating a high-energy impact machine constructed according to our invention.
FIG. 2 is a cross section taken at line 2—2 of FIG. 1.

Referring to FIG. 1, one embodiment of the invention comprises the machine 10 which has a base member 11 which rests upon a foundation, and a pair of vertical side rails 12, 13 with guide flanges 14 (FIG. 2). A pair of transverse members 15, 16 interconnect the side rails at medial positions, and a top member 17 connects them at the top. Transverse members 15, 16 have openings 18, 19 respectively, for passing structure yet to be described.

A pair of driver mechanisms 20, 21 are provided which are identical to each other. Only driver mechanism 20 will be disclosed in detail, it being understood that driver mechanism 21 is identical to it. Furthermore, it will be understood that only one, or more than two, of these mechanisms could be used in a machine. However, for most machines, two driver mechanisms are sufficient to provide the required energy. A plurality of driver mechanisms is ordinarily to be preferred because a better machine balance at the time of impact is more easily attained.

The function of the driver mechanisms is to move a pair of plates 22, 23 toward and away from each other so as to similarly move die parts 24, 25, between which a piece of metal (not shown) is to be placed for forming. Plates 22 and 23 are ordinarily quite massive. For example in the machine illustrated in FIG. 1, the relative movement between the plates is approximately 12 inches, the maximum relative speed attained is about 50 feet per second, and each of the plates weighs approximately 500 pounds, such that the impact delivered is about 25,000 foot-pounds of energy.

A cylinder block 30 (FIG. 1) is attached to the base member and rises therefrom. The cylinder block has a sidetapped port 31 which intersects an axial passage 32. A trombone tube 33 with a passage 33a reciprocates in passage 32. The top of passage 32 is enlarged to receive a gland 34. The gland is threaded into passage 32, and has exterior and interior O-ring seals 35, 36 which seal between the gland and cylinder block, and between the trombone tube and the gland, respectively.

A cylinder 37 is slidedly fitted in an opening 38 in the cylinder block. An O-ring seal 39 is placed in a groove in the outer surface of the cylinder to seal with the wall of opening 38. A vent 39a passes through the cylinder block to the lower end of opening 38. A cap 40 is threaded into the lower end of the cylinder, and is provided with exterior and interior O-ring seals 41, 42. The trombone tube is threadedly engaged to the cap. Vent 39a vents the region within opening 38 between its wall, the trombone tube, the bottom of the cap, and the bottom of the opening, so that no suction or pressure develops in this region when the cylinder moves.

Inside the cylinder and above the cap there is a cup-shaped float 43 having its dished face 44 facing away from the cap. An O-ring seal 45 is fitted between the exterior surface of the cap and the inside wall of the cylinder so that the float is axially slidable therein, and makes a fluid sealing fit with the inside wall of the cylinder. Pressure exerted at port 31 on the cylinder block is transmitted through the passage in the trombone tube to shift the float in the cylinder. The cylinder is freely axially movable in opening 18 of transverse member 15. The cylinder always projects above this transverse member.

A shoulder 47 is formed on the outside of the cylinder. This shoulder is engaged by a ring 48 which surrounds the cylinder, and which has a flange 49 that bears against the shoulder. Bolts 51 draw the ring toward plate 23, clamping the shoulder between the flange and the plate. Thus the cylinder is joined to the plate, and moves with it.

An exterior O-ring seal 53 seals the cylinder with respect to the plate. Inside plate 23 there is a chamber 54 which is of larger transverse cross section than the inside of the cylinder. The chamber and cylinder intersect, and would be in free fluid communication with each other except for the interposition of a driver piston 55 which is slidedly fitted in the cylinder.

The driver piston carries an exterior O-ring seal 56 so that the piston is maintained axially slidable and in fluid sealing with the wall of the cylinder. An axial bleed passage 57 extends between lower face 58 and upper face 59 of the piston. Face 59 of the piston faces into the chamber, and face 58 faces into the cylinder. The piston is threadedly engaged to a post 60.

Figure 3:
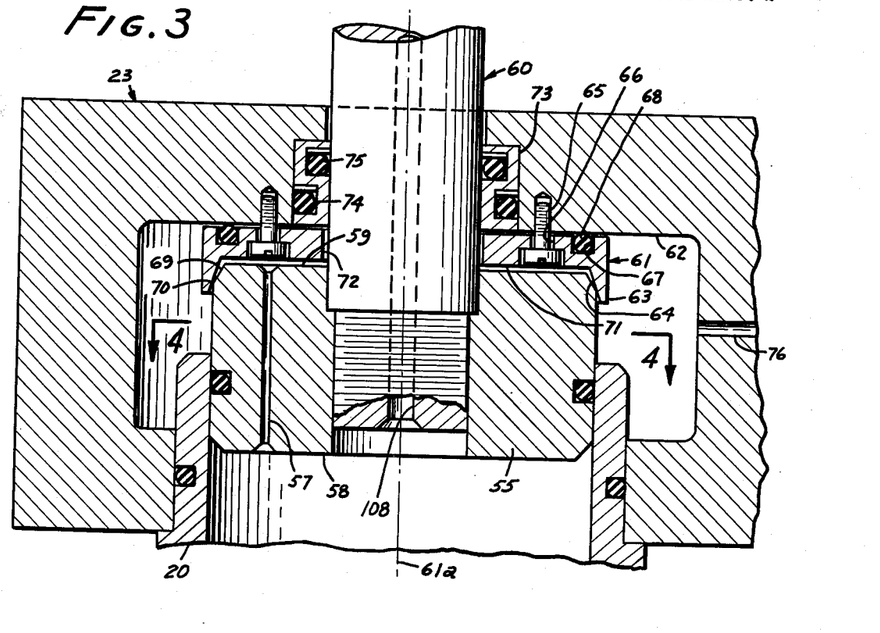
FIG. 3 is an enlarged view of a portion of FIG. 1.
Figure 4:
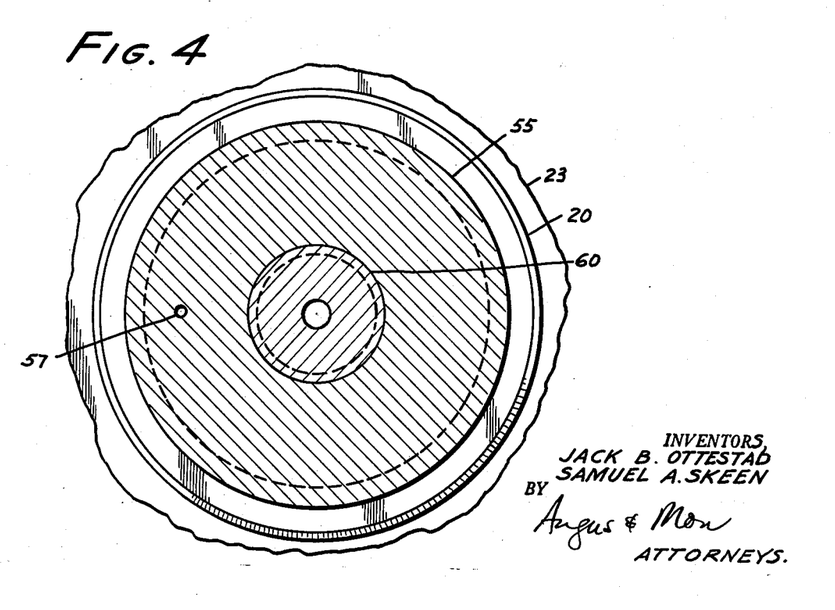
FIG. 4 is a cross section taken at line 4—4 of FIG. 3.

A seat member 61 as illustrated in FIG. 3 is mounted to the upper wall 62 of the chamber in direct line with the cylinder on the axis 61a of the driver mechanism. The seat is circular and has an upstanding lip 63 with an interior frusto-conical seat surface 64. The seat member is mounted to the upper wall of the chamber by screws 65 which have heads that fit in countersunk openings 66. The openings have greater lateral dimensions than the screw heads and shanks so that the seat member can shift laterally relative to the screws. A circumferential ring groove 67 is provided in the upper surface of the seat member with a resilient O-ring seal 68 fitted therein.

It is to be noted that seat member 61 is not itself resilient. In fact, its movable feature is not necessary to the operation of the device although it does make the design and manufacturing considerations broader. It is possible to reduce the volume of the seal to that of groove 67 so that the seat member is rigidly held to the plate, the seal acting only to prevent fluid from leaking out of the chamber. However, greater care must be taken to have the seat member concentric and square with the piston. The movability of the seat member illustrated in FIG. 3 enables it to be off-center relative to the piston at first, but to be centered and cocked by the piston as necessary to make a tight seal with the piston. However, it should be noted that the sealing action between the piston and seat member is made by rigid, non-resilient surfaces. This markedly reduces maintenance because there are no resilient sealing faces which become frayed or distorted in use, only hard and durable metal faces.

The driver piston has a tapered seat surface 69 where the taper of seat surface 69 is greater than that of seat surface 64. The included conical angle of seat surface 64 is 41°, and of seat surface 69, 42°. The sealing edge 70 of surface 69 has a greater diameter than the smallest diameter of surface 64 so that when a seal is made between the driver piston and seat 61, there is a spacing between piston face 59 and surface 71 of the seat. The bleed passage and the cylinder are therefore always in fluid communication with surface 71.

Post 60 passes through a hole 72 in the seat with side clearance, and then through a bushing 73 as shown in FIG. 3. The bushing has exterior and interior O-ring seals 74, 75, thereby sealing the chamber and cylinder off from the outer atmosphere where the post enters the chamber.

A charging passage 76 (FIG. 1) interconnects all chambers in plate 23 and is connected through a conduit 77 which is preferably detachable from the plate, to a charging circuit that includes a three-way valve 78 having its common port connected to conduit 77, and its selector ports connected to a vent 78a and to shutoff valve 79. A pressure-regulator valve 80, and a pump, compressor, or pressure tank 81 connect to the shutoff valve for charging the chamber with operating gas.

Post 60 projects beyond the bushing and through an opening 82 in plate 22 with the opening having a countersink 83 threaded at its upper end to receive a collar 84 on the post. A ring nut 85 is threaded into the counterbore and against the collar to join the post and plate 22.

Upper transverse member 16 stands above plate 22 with clearance therefrom at all times. Mechanism 89 for charging, cocking and supporting the driver mechanism is clamped between transverse member 16 and top member 17.

The top and upper transverse members are drawn together by means, such as tie rods (not shown) to exert a clamping force on a cylinder tube 91. This tube has end plugs 92, 93 at its upper and lower ends, respectively. End plug 92 has an exterior O-ring seal 94, a dished-out recess 95 on its inner face, and a threaded sidetapped port 96 communicating between the recess and the outside of the cylinder assembly.

End plug 93 has three O-ring seals: seal 97 in its end face bearing against transverse member 16; interior seal 98 sealing with a piston rod 99; and an exterior seal 100 sealing with the inside surface of the cylinder tube. A passage 101 extends through plug 93 with side clearance from the piston rod at the lower end of the passage. A threaded sidetapped port 103 communicates through passage 101 with the inside of tube 91.

Piston rod 99 is threadedly engaged and axially aligned with post 60, and has an enlargement which serves as a piston 104. An O-ring seal 105 seals between the piston and the inside of the cylinder tube.

A charging passage 107 extends axially through the piston rod and communicates with charging passage 108 in the post. In turn, charging passage 108 communicates directly with the region inside cylinder 37. Passage 107 is sidetapped by port 109, and is in fluid communication with passage 101 and port 103. Cylinder 37 can therefore be charged with fluid under pressure from port 103.

The upper end of piston rod 99, as seen in FIG. 1, has a metering extension 110 which has slightly lesser transverse dimensions than recess 95 in end plug 92. This extension projects from the piston a lesser distance than the recess is deep.

The preferred charging circuit, which is ordinarily used instead of that connected to conduit 77 (conduit 77 being plugged off at the plate surface when not used), is shown in FIG. 1, wherein ports 103 are interconnected by conduit 112 which connects to the common port of a three-way valve 113 that has one of its selector ports connected to a vent 113a, and the other to a shutoff valve 114. The shutoff valve in turn is connected to a pressure regulator 115 supplied by a pump, compressor, or compressed gas bottle 115a.

The preferred charging circuit also includes (bottom of FIG. 1) a conduit 116 connected to port 31 in the cylinder block, and to the common port of three-way valve 117. One selector port of the three-way valve is connected to a vent 117a, and the other is connected to a shutoff valve 118. The shutoff valve is connected to a pressure regulator 119 supplied by a pump, compressor, or compressed gas bottle 120.

A cocking circuit is provided at the upper end of mechanism 89, which circuit includes conduit 121 connected to ports 96, and to the common port of a three-way valve 122. One selector port of the three-way valve is connected to a pressure accumulator 123 supplied with hydraulic fluid from a pump 124. The other selector port is connected to reservoir 125 from which the pump draws its hydraulic fluid. A pressure relief valve 126 discharges from the pump to the reservoir.

The operation of this device, utilizing the preferred charging circuits, will now be described. Assume first that the device is in the condition shown in FIG. 1 which is the position assumed just before the device is "cocked."

When in the position illustrated, cap 40 rests on the cylinder block and thus supports plate 23. The plate 22 is supported by mechanism 89 wherein the gas pressure within cylinder 91 urges piston 104 upwards. The gas pressure is adjusted to a value which will move plate 22 all the way to the top of its stroke. The metering action exerted by extension 110 slows down the upward movement at the upper end of its stroke so that plate 22 does not strike violently and the upper limit is defined by the volume of hydraulic fluid above piston 104.

The pressure in the support mechanism is supplied from source 115a which also supplies gas for charging the system when the preferred charging circuits are used. The volumes between cylinder 91 and rod 99 and in cylinder 30 and chamber 54 are selected so that a proper quantity of gas is in the system for actuation when the pressure in support mechanism 89 is adequate to support plate 22.

To achieve the arrangement shown in FIG. 1, three-way valve 113 is set to admit that pressure which is set by regulator 115. Then valve 113 is closed. Vent 113a is provided should it be desired to lower the pressure.

As pressure builds up from source 115a, piston 104 moves toward the position shown and draws the post and driver piston upwardly to seal on seat member 61. This movement is aided by the driver piston because, while the bleed passage tends to equalize pressures across it, pressure builds up below it faster than the restricted bleed passage bleeds it down.

The next step is to charge up chamber 54. If pressure for chamber 54 is to be derived from cylinder 37, it must be obtained by feeding through the bleed passage, and the driver piston must be unseated from seat 61 to accomplish this. This unseating is accomplished by setting three-way valve 122 in the cocking circuit to receive pressure from accumulator 123. This pressure forces piston 104 downward, which moves post 60 and driver piston 55 downward. Because cylinder 37, which is connected to plate 23, is bottomed in the cylinder block, the driver piston is unseated from seat 61, and the chamber and cylinder are interconnected through the bleed passage. Valve 122 is closed as soon as the driver piston is unseated, trapping the hydraulic fluid to hold the driver piston unseated.

The charging circuit at the bottom of FIG. 1 is now operated by connecting three-way valve 117 to open valve 118, to pass fluid which may be gas or liquid, under pressure through conduit 116, and passage 33a in the trombone tube, to press against the bottom of float 43. This introduces energy into the system which causes the float to move upwardly, compressing the gas which was supplied to cylinder 37, forcing some of it at an elevated pressure through the bleed passage, past seat member 61, and into chamber 54. As soon as the float strikes the piston, it will stop, there then being equal pressure within the dished portion 44 of the float and chamber 54.

Three-way valve 122 in the cocking mechanism is turned to connect the region above piston 104 to reservoir, thus removing the force that held the driver piston from seating. The gas pressure in chamber 37 acting over the area of post 60 forces said post upward, permitting the driver piston to seat on seat member 61, isolating chamber 54 and cylinder 37 from each other. Valve 122 is then closed. Three-way valve 117 is next turned to vent 117a, and the differential pressure within cylinder 37 causes the float to drop back in the illustrated position. The position illustrated is therefore both that just before "cocking" (pressurizing chamber 54), and that just after "cocking."

There is now a difference in pressure between cylinder 37 and chamber 54. The piston will seat firmly on seat 61 because whatever the pressure is in cylinder 37, it will ultimately be equalized across the two faces of the driver piston by virtue of fluid flow through the bleed port. Then because the area of post 60 is exposed to atmosphere, there is a net force on face 58 tending to seat the driver piston against seat member 61. Assume for a moment that there is a slight leak across the seal between the driver piston and seat 61. Then pressure in cylinder 37 will rise, thereby increasing the force with which the piston is pressed against the seat, until finally the piston presses tightly enough to make a seal. The larger the leak, the greater the sealing forces which are developed. The particular mounting of the seat member shown in FIG. 3 enables the seat to move back and forth and to cock so that as the driver piston presses against the seat, the seat accommodates itself to make a non-leaking fit.

Thus, with the cocking circuit closed, and the charging circuit vented through vent 117a, there is a pressure in chamber 54 which is greater than the pressure in cylinder 37. The relationship between the two pressures is, of course, a function of the original pressure charged through charging conduit 112, and of the ratio between the volume of chamber 54, and the volume of cylinder 37. These are easily ascertained design parameters of the machine.

The machine is now cocked with the plates as far apart as they will go. In order to trigger the machine, it is necessary to unseat the piston from seat 61 to expose upper face 59 of the driver piston to the high pressure of chamber 54. This is accomplished by again turning three-way valve 122 to admit pressure from accumulator 123 through port 96 to the region above piston 104, forcing the piston downward slightly. Because cap 40 bottoms on cylinder 37 in the cylinder block, downward movement of the piston rod forces the driver piston off seat 61. Gas flows substantially instantaneously from chamber 54 into the space between seat 61 and the upper face of the piston faster than it can bleed off through the bleed passage. Therefore, there is a differential pressure across the two faces of the driver piston, and this results in an acceleration force accelerating the driver piston downwardly and pulling plate 22 with it. Plate 22 is accelerated upward by an equal and opposite force acting on the cross-sectional area of the plate immediately above the driver piston.

The energy of the gas compressed into chamber 54 is applied substantially instantaneously to the piston as soon as it is unseated from seat 61.

The pressure applied to move the plates is, of course, greater at the start than near the end of the stroke. In fact, there is a point at which the gas in cylinder 37 has the same pressure as that in the chamber. At that point, the maximum energy release has been attained, and the kinetic energy of the plates would thereafter begin to be used to recompress the gas. It is at this point, or shortly thereafter, that the dies should strike the metal being formed.

The stroke distance to this point in the illustrated machine is about 12 inches, which with a piston 4 inches in diameter, and a chamber pressure of 2,000 pounds per square inch, delivers about 25,000 foot-pounds of energy, the closure rate of the plates at impact being about 50 feet per second. At the said point, the dies 24, 25 will have been brought against the metal part, and the part will be formed. When this blow is delivered, the plates stop suddenly. A principal advantage of this device is that any parts whose motion must be arrested other than by compressive impact can be made quite light. In fact, the only parts whose motion must be arrested other than the plates are the driver piston and cylinder. They can be made quite light so that they can be held on merely by threads or bolts, and in stopping their mass suddenly, undue stress is not placed on the rest of the machine. This is a significant improvement over devices known in the art wherein motion of large masses must be restrained by pulling on them at the time of the impact.

When the device has expended its energy against the metals being formed, the pressures in chamber 54 and in cylinder 37 will be substantially equal. This is because the motion of the plates is arrested at about the point of maximum energy release, which is also about the point of equal pressures. Furthermore, once the driver piston is unseated from seat 61, fluid flow between the chamber and cylinder through the bleed passage is possible at a limited rate, which also tends to equalize the pressures.

The operation of the device will have driven plate 23 upwardly, and plate 22 downwardly. In moving downwardly, plate 22 will have drawn piston 104 with it. This movement compresses the gas in region 101. At this time the gas beneath piston 104 supports both plates. As plate 23 starts to move downwardly, which movement is slowed by the retricted flow of gas through the bleed passage, the pressure beneath piston 104 moves it upwardly. Thus plate 23 gradually approaches its lower position. The blow between the cap and the cylinder block is thus a soft blow, rather than a violet falling one.

When the post was pulled downwardly by plate 22, it will have left a partially evacuated region above piston 104 which has residual hydraulic fluid in it left over from the cocking and triggering operation. The post is prevented from slamming against the upper structure on its return by the metering action between the metering edge 110 and the cap, which restricts the rate at which liquid can flow from the region surrounding the metering device into the region above the piston and within cap 92. This slows down the piston at the upper end of its motion so there is not a sharp upward blow.

The device will thus return to the position shown, and can be run through another cycle merely by actuating the cocking mechanism and again supplying pressure beneath the float the compress the gas into the chamber, after which the above cycle is repeated. No new gas need be charged into the system.

The preferred charging mechanism shown has the advantage that there are no connections with moving parts which might tend to shear off due to the sudden movements in the machinery. There is, however, another means available for charging chamber 54 and that is to charge gas directly therein through valve 78 into conduit 76. When this is done, valve 78 is turned on to charge chamber 54 to the desired pressure, and thereafter the device is set off as recounted above. However, after each such operation, pressure in cylinder 37 would need to be vented before recharging chamber 54. Furthermore, the conduit connecting to conduit 76 should be disconnected before each actuation lest it be sheared off with each operation. These are inconveniences which can be avoided merely by using the preferred circuit.

It will be noted that in the construction of this device, all movable parts, except the driver piston and cylinder 37, have their motion arrested by virtue of movement directly against or toward some other substantially equally opposed force. For example, the plates are opposed to each other, they move toward each other and strike each other through the dies and metal being formed so that they stop by virtue of an abutting action. Furthermore, all of the rods and cylinders associated with these plates are similarly arrested in their motion, or are cushioned by restraining fluid forces exerted ahead of them. It is a relatively simple matter to arrest motion of heavy objects in this manner. However, it is much more difficult to attempt to arrest the motion of heavy objects by restraining their motion from behind, and this has been a cause of failure of many conventional high-energy impact machines. In this device, the driver piston and cylinder 37 are the only portions of the machinery which have their motions arrested by pulling on them. These parts can be made very light because they are not relied on for mass, and can therefore be attached by simple means. Thus the device of this invention has the significant advantage that its elements of heavy mass have their motion arrested by opposed contact by forces and masses of similar magnitude, while the only pieces of equipment whose motions must be abruptly restrained by pulling are of quite low mass, and therefore represent no significant design problem.

This device can be used with only one driver mechanism, such as by placing the driver mechanism at the center of the plates, and symmetrically disposing a plurality of dies around them. However, at least two driver mechanisms will usually be preferred because it is easier to balance the machinery. Furthermore, each driver mechanism adds a significant contribution of energy to the system. It is also possible to use more than two driver mechanisms, the choice being merely one of design based on the considerations of the amount of energy to be supplied, and of balancing the machinery.

A significant advantage of this invention is that, regardless of the number of driver mechanisms involved, they can all be set off at the same moment. This is because the tripping action of unseating the pistons from their seats is provided for all driver mechanisms by applying a hydraulic force from the same source. Furthermore, the actuation of one unit tends to actuate all other units in the system. There is therefore no problem of synchronizing the operating of a plurality of driver mechanisms. Particularly in impact-type machines where heavy masses are propelled at each other, it has been nearly impossible to synchronize the discharge of both bodies, and the non-simultaneous firing of the elements has created unbalanced forces which have tended to destroy the machine, or which have resulted in an ineffective release of energy. This device is able to discharge all of the driver mechanisms simultaneously, and to cause them all to operate to the point of expenditure of greatest energy, something that has not hitherto been attainable in any other high-energy machine.

There are several other advantages of this device as contrasted with other machinery of the same class. One is the simplicity of re-cocking the device. It is unnecessary to bother recharging the device with gas after each firing, because it is all retained in the system. Energy for subsequent actuation is entirely supplied by moving float 43.

Another advantage is that the rigidity of the system increases as the dies approach each other, thereby reducing die alignment problems. The post is side-supported by bushing 73 and by the driver piston. As the driver piston moves into cylinder 37, these points move farther apart, thus reducing the angle through which the post can move due to side clearances, thus increasing the rigidity, reducing the side play.

Still another advantage resides in the compactness of the working area defined between plates 15 and 16, and the side structure. This small a volume can easily be made into a vacuum chamber by providing front and back doors, and then forging can take place with a minimum of scale formation, and without die venting.

The mass distribution of the machine has the inherent advantages that components attached to the working plates can be made quite light, thereby reducing attachment problems, and that the major portion of the kinetic energy is in the plates. The latter feature overcomes the disadvantage inherent in conventional machines that, where the associated components were heavy, much of the energy was absorbed as elastic energy in the components and did no work. This dissipation of energy is nearly eliminated in the present device.

Figure 5:
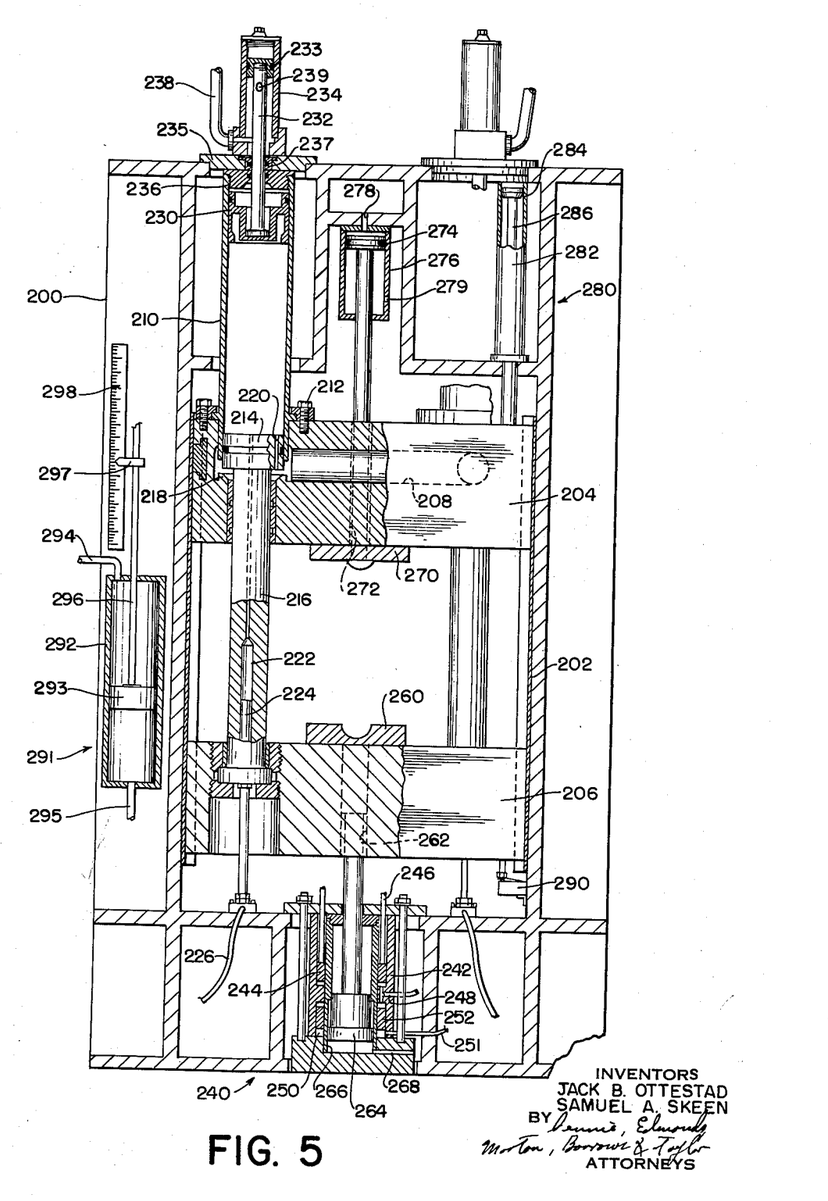
FIG. 5 is a side elevation, partly in cutaway cross section, of another embodiment of a high-energy impact machine constructed according to our invention.

Referring to FIG. 5 in which another embodiment of our invention is shown, 200 represents a vertical frame having gibs 201 to which are attached wear strips 202. Heavy plates 204 and 206 of substantially the same mass slide within the tracks formed by the wear strips and gibs.

Upper plate 204, which comprises a first plate, has therein a high pressure chamber 208 which is adapted to communicate with the interior of two cylinders 210 which are affixed at one end to the plate by bolts 212. For clarity, only one cylinder and its associated parts are shown in the drawings. A driver piston 214 sealingly and slidingly engages the side walls of cylinder 210 and has a mounting post 216 connected thereto. The piston 214 is adapted to seat on an annular valve seat 218 when in the lower end of cylinder 210 to seal off high pressure chamber 208 from the cylinder 210. The piston 214 further has a bleed passage 220 which connects its opposite end faces.

Post 216 is connected to lower plate 206 and has a passage 222 extending therethrough which connects with a source of gas pressure through means of a trombone tube 224 and conduits 226.

A floating piston 230 sealingly and slidingly engages the other end of cylinder 210 and is adapted to be moved in the cylinder by the force of hydraulic pressure entering the cylinder through the tube 232. Tube 232 has a guide piston 233 on one end engaging guide cylinder 234 mounted on flange 235 in turn mounted on the frame 2.

The tube 232 is slidable in 237 to the end 236 of the cylinder 210 so that it slides in the opening 237 as the cylinder 210 and upper plate 204 move up and down. Conduit 238 connects cylinder 234 to a source of hydraulic pressure so that hydraulic fluid may flow from the cylinder 234 into opening 239 and thence through the tube 232 into cylinder 210 to move the floating piston downwards towards the driver piston and compress the gas therebetween.

The lower plate 206 is moved vertically with respect to the upper plate 204 by a combined triggering and lower inching means denoted generally by 240 which comprises a hydraulic cylinder 242 having a doughnut-shaped lower inching piston 244 movable therein connected to rods 246 which in turn are adapted to contact the bottom side of plate 206. The hydraulic cylinder 242 connects through a port 248 to a source of hydraulic pressure as more fully explained hereafter. A cushioning cylinder 250 is positioned below the hydraulic cylinder 242 and has a doughnut-shaped cushioning piston 252 movable therein to form a bottom end wall of the hydraulic cylinder 242. Cushioning cylinder 250 in turn connects with a source of pressurized gas through conduit 251 as more fully explained hereafter.

An advantage of the inching, triggering construction as illustrated in FIG. 5 over that illustrated in FIG. 1 is that frame loading arising from the gas in the machine being compressed is materially reduced. In the construction of FIG. 1, the pressure of the gas compressed during charging acts on piston 104 and on the hydraulic fluid above it resulting in a large axial force being exerted on plug 92 which is absorbed by the frame. In the construction of FIG. 5, there is no similar hydraulic chamber which is subjected to the pressure of the compressed gas during charging.

The bottom plate 206 has thereon a lower die half 260 with a knockout pin 262 extendable therethrough and through the plate 206 to connect with a piston 264 slidable in the lower ejector cylinder 266 connected by a conduit 268 to a source of hydraulic pressure. Gas is injected into the upper half of the cylinder 266 by a conduit not shown so that when the lower knockout pin is extended, piston 264 will compress the gas to return the piston and retract the pin when the hydraulic pressure to cylinder 266 is relieved. The upper plate 204 likewise has a die half 270 having a knockout pin 272 extending therethrough connecting with a piston 274 slidable in cylinder 276 connected to a source of hydraulic pressure by conduit 278. The lower half of the upper ejector cylinder has a port 279 connected to a conduit not shown in order that gas may be injected into the cylinder. The upper knockout pin is then extended by increasing the hydraulic pressure in the cylinder to cause the piston 274 to move down and compress the gas in the lower half of the cylinder. The force of the compressed gas will return the pin to the retracted position when hydraulic pressure in the upper half of the cylinder is removed.

The upper plate 204 is supported against the force of gravity by two compensating or counterbalancing means, only one of which is shown, denoted generally by 280 which in turn comprises a cylinder 282 connected to the frame and having therein a piston 284 connected to the upper plate by a piston rod 286. Gas is injected into the cylinder on the rod side of the piston 284 so that the force of the compressed gas is such as to overcome the force of gravity on plate 204. Hydraulic fluid is admitted into the cylinder above the piston by a conduit, not shown, leading to a source of hydraulic pressure whereby the piston and upper plate may be inched down against the force of the compressed gas. By regulating the hydraulic pressure in the upper compensating cylinder 282 and by regulating the hydraulic pressure in cylinder 242, both the plates 204 and 206 may be slowly inched together in order to accurately position the dies in the plates to assure alignment.

A limit switch 290 is mounted on part of the frame and is actuated by downward movement of the plate 206 to control hydraulic pressure in the triggering cylinder 242. In addition, a control panel, not shown, is mounted on the side of the machine on the frame to control operation of the machine.

An energy regulator and indicator elevated generally by 291 is mounted on the frame 200 and comprises a cylinder 292 having a piston 293 slidable therein. The portion of the cylinder above the piston connects by conduit 294 to a source of hydraulic pressure while the portion below the piston connects by conduit 295 to conduit 226. Piston 293 connects to an indicator rod 296 which is slidable through the end of the cylinder 292 and which has a pointer 297 thereon to indicate on scale 298 the position of the piston 293 in the cylinder and thus the amount of energy available for bringing the plates 204 and 206 together as more fully explained hereafter. For this reason, scale 298 may be dimensioned in units of foot-pounds.

A machine constructed according to that shown in FIG. 5 may operate on approximately 10 second cycles and may deliver as much as 145,000 foot-pounds of energy where the weight of the plates are approximately 4,800 pounds each and where normal operating gas pressure is 1,500 p.s.i.

Figure 6:
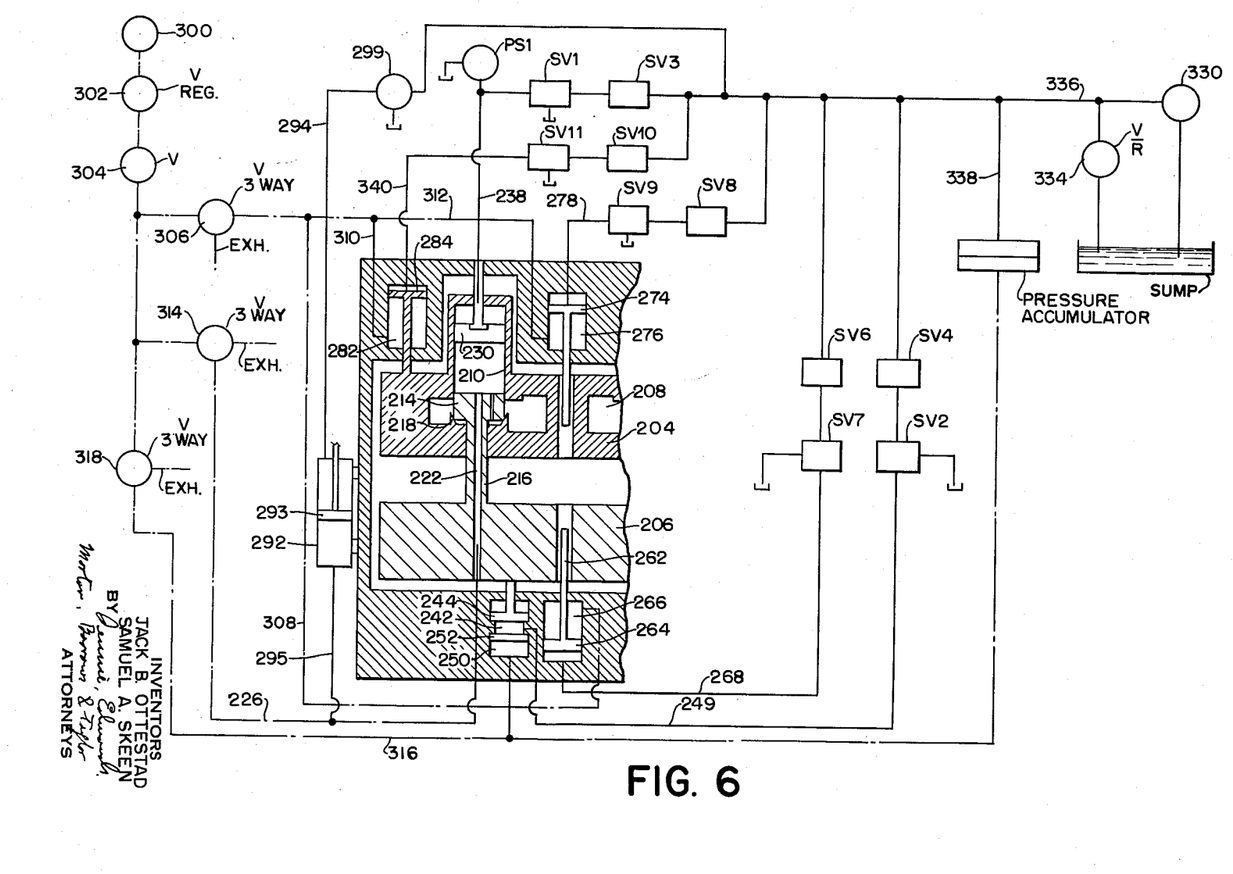
FIG. 6 is a schematic view of the machine shown in FIG. 5 illustrating the various hydraulic and gas circuits for charging and operating the machine.

Referring to FIG. 6, there is illustrated schematically the various hydraulic and gas circuits and controls as applied to the machine of FIG. 5 wherein similar parts are identified by the same numerals. Gas, usually nitrogen, is supplied to the machine from a supply source 300 through a pressure regulator 302 into a two-way control valve 304. A three-way control valve 306, which exhausts to atmosphere, is connected to conduit 308 which extends to the upper half of the lower or bottom ejector cylinder 266. The valve 306 also controls admission of gas into the counterbalance cylinder 282 by way of a conduit 310 and into the lower part of the upper ejector cylinder 276 by way of a conduit 312.

Gas is injected into passage 222 of the post 216 by way of conduit 226 which connects with a three-way valve 314 leading to exhaust and which, in turn, connects with the control valve 304. Gas is injected into the cushioning cylinder 250 by a conduit 316 which connects with a three-way valve 318 leading to exhaust which, in turn, connects with the control valve 304. Conduit 316 further connects with a pressure accumulator.

Hydraulic pressure is supplied to the machine by means of a hydraulic pump 330 which pumps hydraulic fluid from the reservoir or pump. A pressure relief valve 334 prevents hydraulic pressure delivered by the pump 330 from exceeding a predetermined value in the hydraulic system of the machine. Pump 330 is connected by a common conduit 336 which, in turn, is connected by conduits leading to individual portions of the machine. A conduit 338 connects the pressure accumulator to the hydraulic system whereby momentary pressure fluctuations in the system are smoothed out. Conduit 249 connects the lower hydraulic inching and triggering cylinder 242 to common conduit 336 and in which solenoid-operated valves SV2 and SV4 are interposed with the valve SV2 having an outlet returning to sump.

Conduit 268 connects the hydraulic system to the lower half of the bottom ejector cylinder 282 and has interposed therein solenoid-operated valves SV6 and SV7 with valve SV7 having a passage leading to sump.

Conduit 278 joins the upper half of the upper ejector cylinder 276 to the hydraulic system and has interposed therein solenoid-operated valves SV8 and SV9 with valve SV9 having a passage leading to sump.

A conduit 340 joins the upper half of the counter-balance cylinder 282 to the hydraulic system and has interposed therein solenoid-operated valves SV10 and SV11 with valve SV11 having a passage leading to sump.

Conduit 238 joins the upper half of cylinder 210 to the hydraulic system and has interposed therein solenoid-operated valves SV1 and SV3 with the valve SV1 having a passage leading to sump. A pressure responsive valve P.S. 1 is interposed in conduit 238 between solenoid-operated valve SV1 and the cylinder 210 which closes at a predetermined pressure to activate a timer as more fully explained thereafter.

The energy regulator cylinder 292 is joined by conduit 294 to conduit 336 which has a three-way manually operated valve 299 therein by which hydraulic pressure may be admitted into the cylinder or exhausted from the cylinder to sump. The other end of cylinder 292 is joined by conduit 295 to conduit 226 so that gas pressure in cylinder 292 will equal the gas pressure in passage 222.

Figure 7:
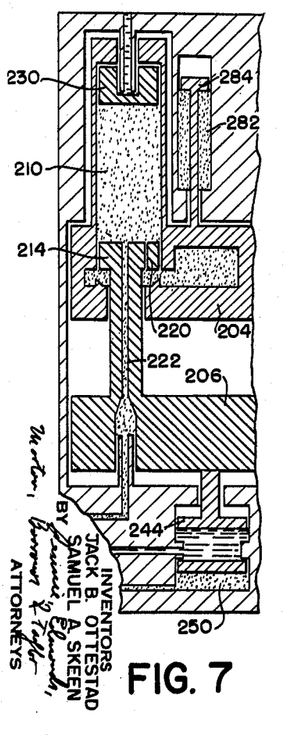
FIG. 7 is a schematic view of the machine of FIG. 5 illustrating the position of the various parts before charging.
Figure 8:
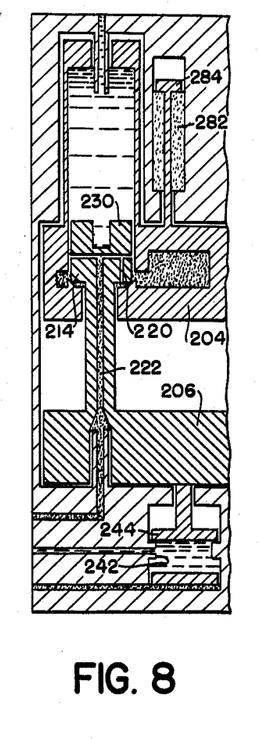
FIG. 8 is a view similar to FIG. 7 illustrating the gas being compressed into the high pressure chamber.
Figure 9:
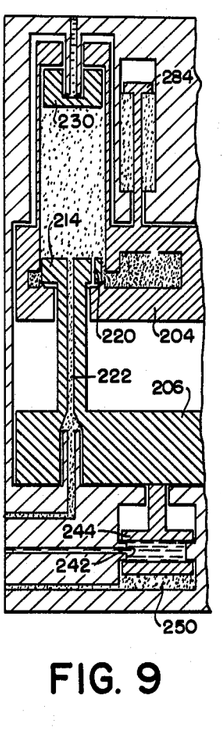
FIG. 9 is a view similar to FIG. 7 illustrating the machine ready for triggering.

Referring to FIGS. 7–11 which illustrate the sequence of operation of the machine, and initially to FIG. 7, it is seen that piston 214 is held off seat 218 by the force of compressed gas in the cushioning cylinder 250 acting on the hydraulic fluid in the cylinder 242 and piston 244. While in this position, gas is injected into conduit 226 through valve 314 so that the gas will pass up through passage 222 into cylinder 210, into the bleed passage 220, and thus into the chamber 208. Valve 314 is then turned to trap the gas after a predetermined pressure has been obtained in the cylinder 210. Hydraulic fluid is then injected into the cylinder 210 through the solenoid-operated valves SV1 and SV3 to force the floating piston 230 downwards to compress gas in the cylinder and to force it through the bleed passage into the chamber 208. As the floating piston 230 moves downward, it will contact the driver piston 214 to force it down so that it seats on the annular valve seat 218 while, at the same time, the lower plate will be moved down to force pistons 244 and 252 downward to cause the gas in the cushioning cylinder to be compressed. The respective members then take the positions as shown in FIG. 8 and the compressed gas in chamber 208 is sealed in the upper plate so that it does not exert any axial force on the driver piston. As the lower plate approaches the bottom limit of its movement, it contacts limit switch 290 which, in turn, actuates solenoid-operated valve SV2 so that the hydraulic pressure in the cylinder 242 is relieved, allowing the piston 252 to move upwards under force of the gas in cylinder 250. Solenoid valve SV1 is then actuated to allow the hydraulic fluid in cylinder 210 to return to sump with the hydraulic fluid being ejected from the cylinder by the force of the compressed gas trapped below the driver piston in the bleed passage driving the floating piston to the upper part of the cylinder 210, as shown in FIG. 9, where the machine is ready for triggering.

As the hydraulic pressure in the conduit between the floating piston and valve SV1 falls to a predetermined value, pressure switch 1 will actuate a timer to energize an electrical system, as more fully explained hereafter whereby solenoid-operated valve SV4 will be actuated so that hydraulic pressure is admitted to inching and triggering cylinder 242. As pressure in cylinder 242 builds up, it will raise the piston 244 and plate 206 slightly so that the driver piston 214 will unseat from the annular valve seat 218. At this instant, the lower face of the driver piston 214 will be exposed substantially instantaneously to the high pressure gas in chamber 208 so that the pressurized gas will provide an acceleration force to accelerate the driver piston and attached plate 206 upwards, while, at the same time, pressurized gas provides an equal acceleration force acting in an opposite direction to accelerate the cylinder and upper plate 204 in a downward direction as shown in FIG. 10.

Figure 10:
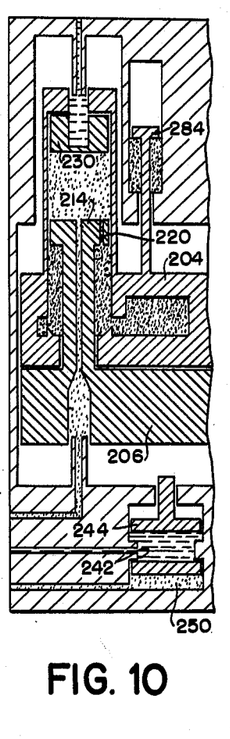
FIG. 10 is a view similar to FIG. 7 illustrating the machine immediately after it has been triggered.
Figure 11:
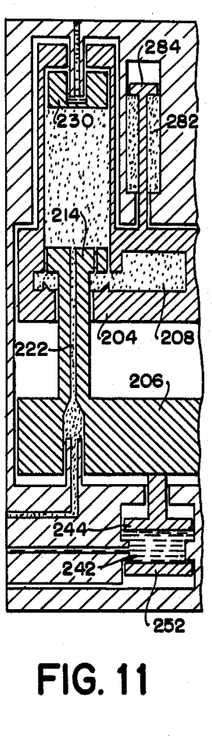
FIG. 11 is a view similar to FIG. 7 showing the parts returned to the starting position.

As plate 204 moves downwards as shown in FIG. 10, it will compress gas contained in the counterbalance cylinder 282 which will provide a restoring force to return the upper plate to the position shown in FIG. 11. Gravity and the gas compressed in the cylinder 210 above the piston 214 as it moves to its upper limit of travel provide the forces to return plate 206 to the position shown in FIG. 11 where the machine is again ready for another cycle of operation.

To regulate the energy available to accelerate the plates towards each other, the amount of gas available for compression in chamber 208 is varied. This is accomplished by varying the amount of gas in the energy regulator cylinder 292 by controlling the amount of hydraulic fluid therein. If it is desired to increase the energy available, valve 299 is turned to admit hydraulic fluid in cylinder 292 to force piston 293 downwards and gas out of the cylinder. The gas thus ejected from cylinder 292 is made available for compression in chamber 208 when the floating piston charges the system causing a greater pressure differential to exist across the piston 214 when the machine is triggered. If it is desired to reduce the energy available, valve 299 is turned to allow fluid to move out of the cylinder 292 to sump under the force of the gas in the cylinder moving piston 293 upwards. The gas entering the cylinder 292 is thus not available to be compressed in chamber 208 resulting in there being a less pressure differential across piston 214 immediately after triggering.

Figure 12:
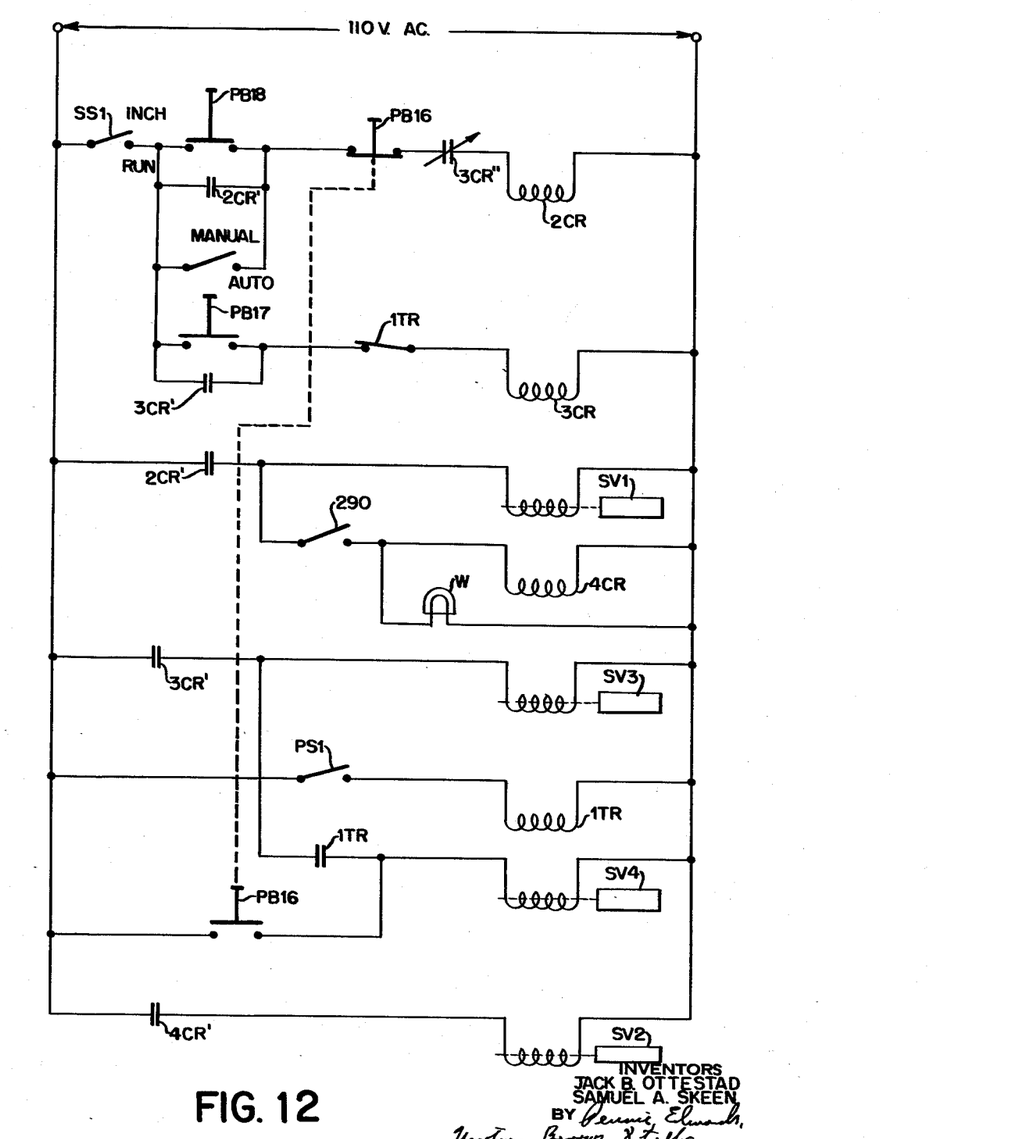
FIG. 12 is a schematic of the charging and triggering electrical circuits.

Reference is now made to FIG. 12 which illustrates the charging and triggering circuit by which the various solenoid valves controlling flow of hydraulic fluid in the system are controlled. A control panel, not shown, may be located at any convenient spot and has thereon the various controls necessary to actuate the impact machine. For convenience, only those controls necessary in the charging and triggering circuit are included in FIG. 12 and the controls by which the electric motor driven pumps for building up the hydraulic pressure are regulated are not shown since they are conventional. A selector switch SS1, as shown in FIG. 12, selects the circuitry between the charging and triggering circuits and between the inching circuits used to inch the two plates towards one another.

As shown, if the selector switch SS1 is moved from the "inch" to the "run" position and the selector switch SS2 is set for manual operation, the charging and triggering proceeds as follows: When the push button PB18 is depressed, it will energize control relay 2CR which, in turn, closes normally open contacts 2CR'. Closure of contact 2CR' will energize solenoid valve SV1 to inject hydraulic fluid into the cylinder 210 so as to depress the floating piston 230 and compress the gas in the cylinder and chamber 208. At the same time, the contact 2CR' locks in the push button PB18. As the pressure builds up in the cylinder 210 and as the floating piston engages the driver piston and forces the plate 206 down, it will contact limit switch 290 to energize relay 4CR. At the same time, a warning light WW will be lighted to indicate that the machine is charged and ready for triggering.

To trigger, push button PB17 is depressed to energize control relay 3CR. Contact 3CR' will close to lock the button PB17 in. At the same time, contact 3CR' will energize solenoid valve SV3 to cause it to close, while, at the same instant, normally closed contact 3CR'' opens, thus de-energizing control relay 2CR and allowing the solenoid valve SV1 to open to allow hydraulic fluid forced from cylinder 210 by entrapped gas forcing piston 230 upwards to return to sump.

As the pressure reduces in the cylinder 210 to a predetermined value, pressure switch PS1 is triggered to energize the timer relay 1TR. Contact 1TR' closes to energize the solenoid valve SV4 allowing hydraulic fluid to be admitted to the triggering cylinder 242. As soon as sufficient hydraulic pressure has been built up in the cylinder to raise the lower plate, the unit actuates and fires. The hydraulic fluid will continue to flow in the triggering cylinder 242 during the period that the timer relay remains closed, which is approximately ½ second. After this period, the 1TR opens, thus de-energizing control relay 3CR which, in turn, de-energizes the solenoid-operated valve SV4, stopping flow of fluid to the inching or triggering cylinder.

The cycle is then complete and the system is stopped by depressing the stop button PB16 which will unlock the charge button PB18 and re-energize valve SV4.

In the event that the cycles are to be repetitive, selector switch SS2 is turned to the "auto" position whereby the charging of the machine will be automatic with the only manual requirement being that the triggering button PB17 be actuated for each stroke or firing of the machine.

Figure 13:
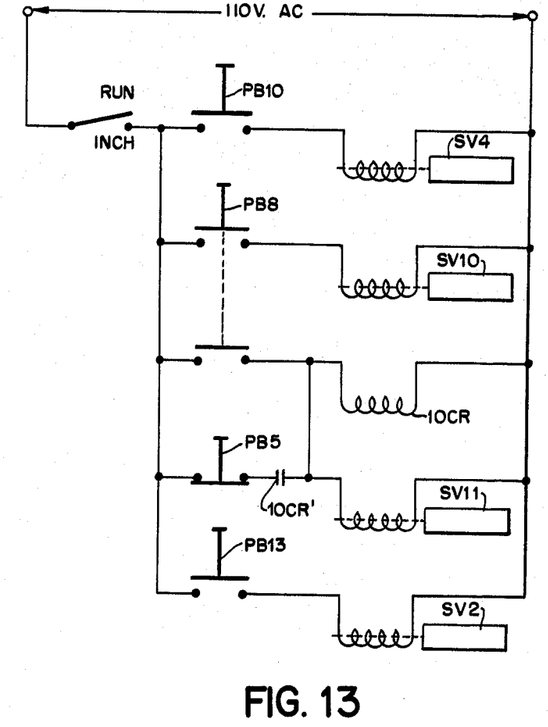
FIG. 13 is a schematic of the inching electrical circuit.

The inching circuit whereby the upper and lower plates may be slowly moved up and down to regulate alignment of the dies is illustrated in FIG. 13. There the selector switch SS1, as shown in FIG. 12, is turned to the "inch" position as shown in FIG. 13. The upper and lower plates may then be inched up or down by pushing either buttons PB10, PB8, PB5, or PB13. If button PB10 is pushed, it will energize solenoid valve SV4 which causes hydraulic fluid to flow into the lower inching cylinder 242 to raise the lower plate. The inching button PB10 is spring biased as are all of the inching control push buttons so that the buttons must be held down all the time that the inching is taking place. To lower the lower plate, button PB13 is depressed which energizes solenoid valve SV2 to allow the hydraulic fluid contained in the inching cylinder to exhaust to sump.

To lower the upper plate 204, the button PB8 is depressed which energizes solenoid valve SV10 allowing hydraulic fluid to flow into the upper part of the counterbalance cylinders to force the pistons therein down against the pressure of the gas contained in the cylinder. At the same time, control relay 10CR energizes to close contact 10CR', thus energizing solenoid valve SV11 to close it to sump. The solenoid valve SV11 is locked closed and in order to raise the upper plate, it is necessary to depress push button PB5 to break the circuit, thus de-energizing solenoid valve SV11 whereby the valve will open to sump to allow the upper plate to move upwards under the force of the compressed gas contained in the counterbalance cylinders and to force hydraulic fluid out through the valve.

Figure 14:
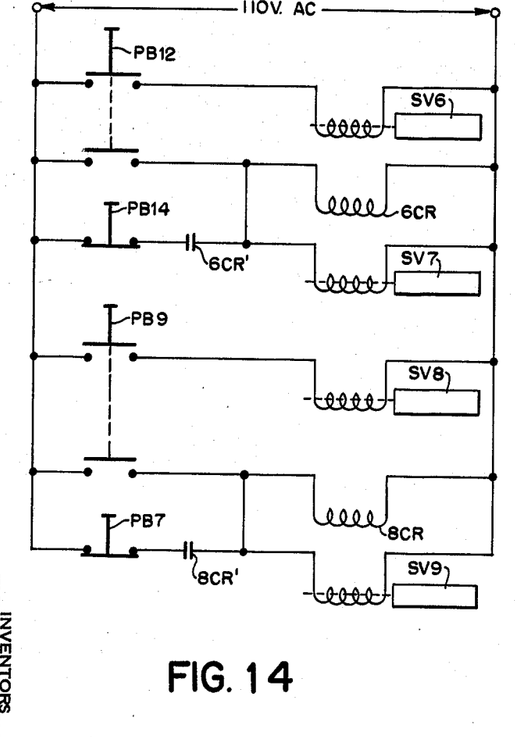
FIG. 14 is a schematic of the ejector pin electrical circuit.

The circuit controlling the ejector pins is illustrated in FIG. 14. The bottom ejector pin is moved upwards by depressing button PB12, which energizes solenoid valve SV6. At the same time, control relay 6CR is energized to close normally open contact 6CR' which energizes solenoid valve SV7 to insure that it is not open to sump. Hydraulic fluid will then flow through valves SV6 and SV7 to the lower ejector cylinder 266. To release hydraulic pressure to allow the ejector pin to move downward under the force of the gas above piston 264, push button PB14 is depressed, thus de-energizing solenoid valve SV7 allowing the oil in the cylinder to flow through the valve to sump.

The upper ejector pin is moved downwards by depressing push button PB9 to energize solenoid valve SV8. At the same time, relay 8CR is energized, thus closing normally open contacts 8CR' which will lock in solenoid valve SV7 whereby hydraulic fluid may flow into the upper ejector cylinder 276 to force the ejector pin downwards. To raise the upper ejector pin, push button PB7 is depressed so de-energizing the solenoid valve SV9 allowing gas pressure in the ejector cylinder 282 to force the piston therein upwards and the oil out through the valve SV9 to sump.

While I show in FIG. 14 manually-operated push buttons energizing the ejector pin circuitry, it is apparent that the various ejector circuits could be similarly energized by cam-operated switches whereby the ejector pins may be caused to eject parts from the die halves when the plates reach a predetermined position with respect to one another.

Further, it is contemplated that the circuitry of the machine may be varied in order to accommodate remote control points, for example to accommodate inching controls positioned near the edge of the plates where they are conveniently situated close to the dies in order to facilitate alignment thereof.

While the particular illustrated annular valve seat and cooperating driver piston for sealing the chamber in the plate with respect to the cylinder is a preferred embodiment, other valve arrangements may be utilized provided that they may release the energy of the compressed gas in a manner to meet certain requirements. One requirement is that the full pressure of the compressed gas be released to act over a reaction area (end face of the driver piston and end of the cylinder) substantially instantaneously, that is on the order of .001 second, to provide a force to accelerate the driver piston and cylinder to obtain maximum kinetic energy for a given gas energy. Another requirement is that there be a flow passage of sufficient size connecting the pressure source and reaction area to insure that the energy of the compressed gas is utilized to accelerate the driver piston and cylinder and is not wasted in frictional or flow losses while flowing from the pressure source to the reaction area.

We claim:

1. A high-energy impact machine comprising: a pair of plates movable toward and away from each other, a first of said plates having a chamber and a cylinder therein, said chamber and cylinder intersecting each other; a driver piston slidably fitted in said cylinder, said driver piston having a first end face facing toward the chamber and an opposite second end face facing into the cylinder; a bleed port therethrough connecting said faces, the piston making a fluid sealing fit in said cylinder so as to shut off fluid communication between the chamber and cylinder except through the bleed port; a seat member in said chamber so disposed and arranged as to engage the driver piston in one driver piston position to shut off communication through the bleed port and isolate the first end face of the driver piston from the chamber; a post attached to the second of said plates, said post entering the first plate, and being attached to the driver piston; means for supplying gas under pressure to the chamber; and means for moving the driver piston off the seat to expose the first end face of the driver piston to chamber pressure, thereby forcing the first plate and the driver piston in opposite directions to move the plates toward each other.

2. A high-energy impact machine according to claim 1 in which the seat member is annular and has a central opening to pass the post, the seat member having a tapered seat facing the driver piston which is adapted to seal therewith in said position, the seat member also having a face on the opposite side from said tapered seat facing toward the wall of the chamber, and a resilient seal, sealing between said last-named face and the wall.

3. A high-energy impact machine according to claim 2 in which the said opposite face of the seat member has a groove therein which extends around the opening, the resilient seal having a volume greater than the groove so that it always projects beyond said seat member and allows the seat member to cock angularly.

4. A high-energy impact machine according to claim 3 in which the seat member is attached to the wall of the chamber by bolts, there being side and end clearance around the bolts to permit the seat member to shift laterally relative to the post as well as to cock angularly.

5. A high-energy impact machine comprising: a pair of massive plates movable toward and away from each other, a first of said plates having a chamber therein and a first cylinder mounted thereto and projecting therefrom, the interior of said chamber and first cylinder intersecting each other; a driver piston slidably fitted in said first cylinder, said driver piston having a first end face facing toward the chamber and an opposite second end face facing into the first cylinder, and a bleed port therethrough, connecting said end faces, the piston making a fluid sealing fit in said cylinder so as to shut off fluid communication between the chamber and the first cylinder except through the bleed port; a ring-shaped seat member in said chamber so disposed and arranged as to engage the driver piston in one driver piston position to shut off communication through the bleed port and isolate the first end face of the driver piston from its chamber; a post attached to and projecting from the second of said plates, passing through the first plate, and attached to the driver piston, whereby reciprocation of the driver piston in the cylinder moves the plates toward and away from each other; a cup-shaped float in said first cylinder on the other side of the driver piston from the plate, said float making a fluid-sealing fit in the first cylinder and having a cup-shaped face facing toward the driver piston, means for pressurizing fluid in the first cylinder comprising a source of fluid pressure connected to the first cylinder on the other side of the float from the driver piston, and means for holding the driver piston off the seat member while the float is forced toward the driver piston to force gas through the bleed port into the chamber, said last-named means also serving to trigger the machine by moving the driver piston off the seat member after the force is removed from the float.

6. A high-energy impact machine according to claim 5 in which a piston rod is connected to said post, and a second piston is connected to said piston rod, and in which a second cylinder makes a slidable fluid-sealing fit around said second piston, whereby fluid pressure beneath the piston tends to move the second plate away from the first plate to bias the driver piston toward the seat member.

7. A high-energy impact machine according to claim 6 in which means are provided for supplying gas under pressure to the region within said second cylinder beneath said second piston, and in which a passage interconnects said region with the first cylinder at the second end face of the driver piston.

8. A high-energy impact machine according to claim 7 in which the means for holding the driver piston off the seat member during the movement of the float member comprises a source of fluid under pressure connected to the second cylinder above the second piston.

9. A high-energy impact machine according to claim 8 in which a metering passage is provided at the upper end of the second piston and second cylinder to meter movement of the second piston.

10. A high-energy impact machine comprising: a pair of massive plates movable toward and away from each other, a first of said plates having a chamber therein and a first cylinder mounted thereto and projecting therefrom, the interior of said chamber and said first cylinder intersecting each other; a driver piston slidably fitted in said first cylinder, said driver piston having a first end face facing toward the chamber and an opposite second end face facing into the cylinder, and a bleed port therethrough connecting said end faces, the piston making a fluid-sealing fit in said cylinder so as to shut off fluid communication between the chamber and the first cylinder except through the bleed port; a ring-shaped seat member in said chamber so disposed and arranged as to engage the driver piston in one driver piston position to shut off communication through the bleed port and isolate the first end face of the driver piston from its chamber; a post attached to and projecting from the second of said plates, passing through the first plate, and being attached to the driver piston, whereby reciprocation of the driver piston in the first cylinder moves the plates toward and away from each other; a cup-shaped float in said first cylinder on the other side of the driver piston from the plate, said float making a fluid-sealing fit in the first cylinder and having a cup-shaped face facing toward the driver piston; means for pressurizing fluid in the first cylinder comprising a source of fluid pressure connected to the first cylinder on the other side of the float from the driver piston; and means for holding the driver piston off the seat member while the float is forced toward the driver piston to force gas through the bleed port into the chamber; a cylinder block having an opening in which the first cylinder is reciprocable; a cap in the end of the first cylinder facing the cylinder block; a trombone tube affixed to and passing through said cap making fluid connection between the inside of the cylinder below the float and a region within the cylinder block, the trombone tube making a slidable fluid-sealing fit in the cylinder block independent of the axial position of the cylinder; and fluid to move the float passing through the cylinder block and trombone tube to the float.

11. A high-energy impact machine according to claim 10 in which the seat member is annular, and has a central opening to pass the post, the seat member having a tapered seat facing the driver piston which is adapted to seal therewith in said position, the seat member also having a face on the opposite side from said tapered seat facing toward the wall of the chamber, and a resilient seal for sealing between said last-named face and the wall.

12. A high-energy impact machine according to claim 11 in which the said opposite face of the seat member has a groove therein which extends around the opening, the resilient seal having a volume greater than the groove so that it always projects beyond said seat member and allows the seat member to cock angularly.

13. A high-energy impact machine according to claim 12 in which the seat member is attached to the wall of the chamber by bolts, there being side and end clearance around the bolts to permit the seat member to shift laterally relative to the post as well as to cock angularly.

14. A high-energy impact machine according to claim 13 in which the means for moving the float comprise a fluid circuit including a three-way valve adjustable to supply pressure and to vent the trombone tube.

15. A high-energy impact machine according to claim 10 in which a piston rod is connected to said post, and a second piston is connected to said piston rod, and in which a second cylinder makes a slidable fluid-sealing fit around said second piston, whereby fluid pressure beneath the piston tends to move the second plate away from the first plate to bias the driver piston toward the seat member.

16. A high-energy impact machine according to claim 15 in which means are provided for supplying gas under pressure to the region within said second cylinder beneath said second piston, and in which a passage interconnects said region with the first cylinder at the second end face of the driver piston.

17. A high-energy impact machine according to claim 16 in which the means for holding the driver piston off the seat member during the movement of the float member comprises a source of fluid under pressure connected to the second cylinder above the second piston.

18. A high-energy impact machine according to claim 17 in which a metering passage is provided at the upper end of the second piston and second cylinder to meter movement of the second piston.

19. A high-energy impact machine comprising: first and second movable plates of substantially equal mass adapted to be simultaneously accelerated towards each other at substantially equal rates by an acceleration force; a source of a confined pressurized elastic medium; a cylinder associated with said first plate adapted to be in pressure communication with said source; a driver piston in sealing and slidable contact with the side walls of said cylinder wherein said driver piston has opposite end faces; connecting means for connecting said driver piston and said second plate; and valve means for providing substantially instantaneous release of said pressurized elastic medium from said source whereby said medium will flow into said cylinder to act on one end face of said driver piston and to act on one end of said cylinder to provide an acceleration force to simultaneously accelerate said driver piston and cylinder in opposite directions and said plates toward each other at substantially equal rates.

20. A high-energy impact machine comprising: first and second movable plates of substantially equal mass adapted to be simultaneously accelerated towards each other by an acceleration force; a source of a confined pressurized elastic medium; a cylinder associated with said first plate adapted to be in pressure communication with said source; a driver piston in sealing and slidable contact with the side walls of said cylinder wherein said driver piston has opposite end faces; connecting means for connecting said driver piston and said second plate; and a valve opening in said first plate adapted to be closed by said driver piston when said driver piston is positioned in one end of said cylinder to confine said pressurized elastic medium in said source and, whereby when said driver piston is moved to open said valve opening, said pressurized elastic medium is substantially instantaneously released from said source to flow into said cylinder to act on an end face of said piston and an end of said cylinder to provide an acceleration force to simultaneously accelerate said piston and cylinder in opposite directions and said plates toward each other.

21. A high-energy impact machine comprising: first and second movable plates of substantially equal mass adapted to be simultaneously accelerated towards each other by an acceleration force; a source of a confined pressurized elastic medium; a cylinder associated with said first plate adapted to be in pressure communication with said source; a driver piston in sealing and slidable contact with the side walls of said cylinder wherein said driver piston has opposite end faces; connecting means for connecting said driver piston and said second plate; a bleed passage connecting said opposite end faces of said driver piston through which elastic medium may bleed to allow said driver piston and cylinder to move with respect to one another so that said plates may move away from each other; and a valve opening in said first plate adapted to be closed by said driver piston when said driver piston is positioned in one end of said cylinder to confine said pressurized elastic medium in said source and, whereby when said driver piston is moved to open said valve opening, said pressurized elastic medium is substantially instantaneously released from said source to flow into said cylinder to act on an end face of said piston and an end of said cylinder to provide an acceleration force to simultaneously accelerate said piston and cylinder in opposite directions and said plates toward each other.

22. A high-energy impact machine comprising: first and second movable plates of substantially equal mass adapted to be simultaneously accelerated towards each other by an acceleration force; a source of a confined pressurized elastic medium; a cylinder associated with said first plate adapted to be in pressure communication with said source; a driver piston in sealing and slidable contact with the side walls of said cylinder wherein said driver piston has opposite end faces; connecting means for connecting said driver piston and said second plate; a bleed passage connecting said opposite end faces of said driver piston through which elastic medium may bleed to allow said driver piston and cylinder to move with respect to one another so that said plates may move away from each other; a floating piston sealingly and slidably engaging the side walls of said cylinder; charging means for moving said floating piston towards said driver piston to compress elastic medium therebetween and to force said medium through said bleed passage into said source; a valve opening in said first plate adapted to be closed by said driver piston when said driver piston is positioned in one end of said cylinder to confine said pressurized elastic medium in said source, and whereby when said driver piston is moved to open said valve opening, said pressurized elastic medium is substantially instantaneously released from said source to flow into said cylinder to act on an end face of said piston and an end of said cylinder to provide an acceleration force to simultaneously accelerate said piston and cylinder in opposite directions and said plates toward each other; and inching means contacting said second plate with a force sufficient to hold said driver piston off the end of said cylinder so that it does not seal said valve opening when said floating piston moves towards said driver piston, said inching means being overcome when said floating piston contacts said driver piston to move it to the end of said cylinder to allow said driver piston to close said valve opening.

23. A high-energy impact machine comprising: first and second movable plates of substantially equal mass adapted to be simultaneously accelerated towards each other by an acceleration force; a source of a confined pressurized elastic medium; a cylinder associated with said first plate adapted to be in pressure communication with said source; a driver piston in sealing and slidable contact with the side walls of said cylinder wherein said driver piston has opposite end faces; connecting means for connecting said driver piston and said second plate; a bleed passage connecting said opposite end faces of said driver piston through which elastic medium may bleed to allow said driver piston and cylinder to move with respect to one another so that said plates may move away from each other; a floating piston sealingly and slidably engaging the side walls of said cylinder; charging means for moving said floating piston towards said driver piston to compress elastic medium therebetween and to force said medium through said bleed passage into said source; a valve opening in said first plate adapted to be closed by said driver piston when said driver piston is positioned in one end of said cylinder to confine said pressurized elastic medium in said source and, whereby when said driver piston is moved to open said valve opening, said pressurized elastic medium is substantially instantaneously released from said source to flow into said cylinder to act on an end face of said piston and an end of said cylinder to provide an acceleration force to simultaneously accelerate said piston and cylinder in opposite directions and said plates toward each other; inching means contacting said second plate with a force sufficient to hold said driver piston off the end of said cylinder so that it does not seal said valve opening when said floating piston moves towards said driver piston, said inching means being overcome when said floating piston contacts said driver piston to move it to the end of said cylinder to allow said driver piston to close said valve opening; and triggering means associated with said inching means whereby said second plate may be moved in order that said driver piston will unseal from said valve opening.

24. A high-energy impact machine having: first and second heavy plates of substantially equal mass adapted to be simultaneously accelerated towards each other by the force of a compressed gas; a cylinder attached to said first plate; a chamber in said first plate for confining compressed gas and adapted to be in pressure communication with said cylinder; a driver piston connected to said second plate, slidable in said cylinder, and sealing off said cylinder from said chamber when positioned in one end of said cylinder; a bleed passage connecting opposite end faces of said driver piston; a floating piston slidable in said cylinder under the force of hydraulic pressure and normally positioned in the opposite end of said cylinder from said driver piston; cushion means urging said driver piston in a direction to unseal said chamber from said cylinder; charge control means for admitting hydraulic fluid to said cylinder to cause said floating piston to move towards said driver piston and compress gas therebetween and through said bleed passage into said chamber and to cause said floating piston to contact said driver piston to move it to an end of said cylinder whereby the compressed gas is confined in said chamber; and trigger control means for relieving said hydraulic pressure in said cylinder to allow said floating piston to move to the end of said cylinder opposite said driver piston under the force of compressed gas in said bleed passage and for causing a force to be exerted to move said lower piston to release gas from said chamber whereby said compressed gas will act on an end face of said driver piston to simultaneously accelerate said driver piston and cylinder in opposite directions.

25. A high-energy impact machine having: first and second heavy plates of substantially equal mass adapted to be simultaneously accelerated towards each other by the force of a compressed gas; a cylinder attached to said first plate; a chamber in said first plate for confining compressed gas and adapted to be in pressure communication with said cylinder; a driver piston connected to said second plate, slidable in said cylinder, and sealing off said cylinder from said chamber when positioned in one end of said cylinder; a bleed passage connecting opposite end faces of said driver piston; a floating piston slidable in said cylinder under the force of hydraulic pressure and normally positioned in the opposite end of said cylinder from said driver piston; cushion means urging said driver piston in a direction to unseal said chamber from said cylinder; charge control means for admitting hydraulic fluid to said cylinder to cause said floating piston to move towards said driver piston and compress gas therebetween and through said bleed passage into said chamber and to cause said floating piston to contact said driver piston to move it to an end of said cylinder whereby the compressed gas is confined in said chamber; trigger control means for relieving said hydraulic pressure in said cylinder to allow said floating piston to move to the end of said cylinder opposite said driver piston under the force of compressed gas in said bleed passage and for causing a force to be exerted to move said lower piston to release gas from said chamber whereby said compressed gas will act on an end face of said driver piston to simultaneously accelerate said driver piston and cylinder in opposite directions; and energy regulator and indicator means comprising a regulator cylinder in pressure communication with said chamber when said driver piston unseals said chamber, means for varying the effective volume of said regulator cylinder to regulate the volume of gas therein, and means for indicating the amount of gas therein whereby as gas volume in said regulator cylinder is increased, the energy available from the compressed gas in said chamber to accelerate said plates towards each other is reduced.

26. A high-energy impact machine of the type having two heavy plates of substantially equal mass adapted to be simultaneously accelerated towards each other by actuating means wherein said machine has a combined inching-triggering means comprising: a hydraulic inching-triggering cylinder; a piston in said cylinder having a piston rod contacting one of said plates; inching control means for controlling admission of hydraulic fluid to said inching-triggering cylinder to slowly move said plate in contact with said piston rod; and separate trigger control means for controlling admission of hydraulic fluid into said inching-triggering cylinder whereby said plate may be moved to trigger said actuating means to cause said plates to rapidly accelerate towards each other.

27. A high-energy impact machine of the type having two heavy plates of substantially equal mass adapted to be simultaneously accelerated towards each other by actuating means wherein said machine has a combined inching-triggering means comprising: a hydraulic inching-triggering cylinder; a piston in said cylinder having a piston rod contacting one of said plates; inching control means for controlling admission of hydraulic fluid to said inching-triggering cylinder to inch said plate in contact with said piston rod; separate trigger control means for controlling admission of hydraulic fluid into said inching-triggering cylinder whereby said plate may be moved to actuate said actuating means to cause said plates to rapidly accelerate towards each other; a cushioning cylinder positioned adjacent said inching-triggering cylinder; a cushioning piston in said cushioning cylinder wherein said cushioning piston forms a movable end wall of said inching-triggering cylinder; and elastic means in said cushioning cylinder urging said cushioning piston towards said inching-hydraulic piston.

28. A high-energy impact machine having: first and second heavy plates of substantially equal mass adapted to be simultaneously accelerated towards each other by the force of a pressurized gas; a chamber in said first plate in which pressurized gas may be confined; a cylinder extending into said first plate and adapted to be in pressure communication with said chamber; a driver piston slidable in said cylinder adapted to seal off said chamber from said cylinder when in one end of said cylinder; connecting means joining said second plate and driver piston; charge control means for compressing gas in said chamber and for moving said driver piston to confine the compressed and pressurized gas in said chamber by sealing off said chamber from said cylinder; and trigger means for moving said driver piston to unseal said chamber from said cylinder whereby said pressurized gas will be released from said chamber and act on said driver piston and an end of said cylinder to accelerate said cylinder and piston in opposite directions and to accelerate said plates towards each other.

29. A high-energy impact machine of the type having at least one movable plate, a source of confined pressurized elastic medium, a cylinder adapted to be in pressure communication with said source, a driver piston in sealing and sliding contact with the side walls of said cylinder, connecting means for connecting said driver piston and said plate, valve means for providing substantial instantaneous release of said pressurized elastic medium from said source whereby said medium will flow into said cylinder to act on said driver piston and provide an acceleration force to accelerate said piston and plate, energy regulator means whereby the amount of said confined pressurized elastic medium available to flow into said cylinder may be varied before said valve means are open, and indicator means to measure the energy of said confined pressurized elastic medium remaining in said source.

References Cited in the file of this patent
UNITED STATES PATENTS

| | | |
|---|---|---|
| 1,633,970 | Ball | June 28, 1927 |
| 2,678,156 | Henderson | May 11, 1954 |
| 2,862,475 | Kinsman | Dec. 2, 1958 |
| 2,915,043 | Neiner | Dec. 1, 1959 |
| 2,931,218 | Ottestad | Apr. 5, 1960 |
| 2,932,951 | Ottestad | Apr. 19, 1960 |
| 2,949,080 | Ottestad | Aug. 16, 1960 |
| 2,959,049 | Luttrell | Nov. 8, 1960 |
| 2,997,025 | Ottestad | Aug. 22, 1961 |
| 3,036,538 | Ottestad | May 29, 1962 |